United States Patent
Li et al.

(10) Patent No.: US 8,930,433 B2
(45) Date of Patent: Jan. 6, 2015

(54) SYSTEMS AND METHODS FOR A FLOATING-POINT MULTIPLICATION AND ACCUMULATION UNIT USING A PARTIAL-PRODUCT MULTIPLIER IN DIGITAL SIGNAL PROCESSORS

(75) Inventors: Zhihong Li, Plano, TX (US); Tong Sun, Frisco, TX (US); Zhikun Cheng, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 338 days.

(21) Appl. No.: 13/455,064

(22) Filed: Apr. 24, 2012

(65) Prior Publication Data

US 2013/0282783 A1    Oct. 24, 2013

(51) Int. Cl.
*G06F 7/38* (2006.01)

(52) U.S. Cl.
USPC .......................................... 708/501; 708/511

(58) Field of Classification Search
CPC ...... G06F 7/4812; G06F 7/487; G06F 7/4876
USPC ........................................ 708/501, 503, 511
See application file for complete search history.

(56) References Cited

U.S. PATENT DOCUMENTS

| | | | |
|---|---|---|---|
| 2003/0041082 A1* | 2/2003 | Dibrino ......................... | 708/501 |
| 2006/0149803 A1* | 7/2006 | Siu et al. ....................... | 708/501 |
| 2009/0077152 A1* | 3/2009 | Powell et al. ................. | 708/501 |

OTHER PUBLICATIONS

Suzuki, H., et al., "Leading-Zero Anticipatory Logic for High-Speed Floating Point Addition," IEEE Journal of Solid-State Circuits, vol. 31, No. 8, Aug. 1996, 8 pages.
"IEEE Standard for Floating-Point Arithmetic," IEEE Computer Society, IEEE Std. 754™-2008, (Revision of IEEE Std 754-1985), Aug. 29, 2008, 70 pages.

* cited by examiner

*Primary Examiner* — Chuong D Ngo
(74) *Attorney, Agent, or Firm* — Slater & Matsil, L.L.P.

(57) ABSTRACT

An embodiment of an apparatus performs a floating-point multiply-add process on a first multiplicand, a second multiplicand, and an addend. A leading 0 bit is added to a mantissa of the first multiplicand to form an expanded first mantissa, and a partial-product multiplication is performed on the expanded first mantissa and a mantissa of the second multiplicand to produce partial-product sum and a partial-product carry mantissas. Leading bits of the partial-product sum and carry mantissas are changed to 0 bits if they are both 1 bits, and the partial-product sum and the partial-product carry are shifted right according to an exponent difference of a product of the first multiplicand and the second multiplicand. Otherwise both the partial-product sum and carry mantissas are arithmetically shifted right according to the exponent difference. The first and second multiplicands and the addend can be complex numbers.

20 Claims, 5 Drawing Sheets

US 8,930,433 B2

SYSTEMS AND METHODS FOR A FLOATING-POINT MULTIPLICATION AND ACCUMULATION UNIT USING A PARTIAL-PRODUCT MULTIPLIER IN DIGITAL SIGNAL PROCESSORS

TECHNICAL FIELD

The present invention relates generally to systems and methods for digital computation, and more particularly to systems and methods for constructing a floating-point multiply-add unit in a system such as a digital signal processor or a hardware accelerator.

BACKGROUND

Adders and multipliers are logical elements that perform basic digital numerical operations in digital processors such as microprocessors, digital signal processors ("DSPs"), arithmetic logic units ("ALUs"), hardware accelerators ("HACs"), etc. The overall performance of such devices is generally dependent on the speed and energy efficiency of its constituent logical elements. Adders, multipliers, and other logical elements are generally required to perform floating-point calculations, which inherently increase their complexity. The cost of microprocessors, DSPs, etc., is substantially proportional to the silicon area required to implement the logical elements from which they are formed. Thus, the design of adders, multipliers, etc., is an important consideration in providing a competitive design for an end product, and any improvement in efficiency and reduction in silicon area required for implementation can have a substantial impact on market acceptance. A particular concern is reducing the bit width of arithmetic registers.

The ability to improve the performance and reduce the silicon area required to implement ALUs, HACs, etc., without incurring unnecessary cost would answer an important market need.

SUMMARY OF THE INVENTION

Technical advantages are generally achieved by embodiments of the present invention which provide an apparatus and method to perform a floating-point multiply-add process on a first multiplicand, a second multiplicand, and an addend.

In accordance with an example embodiment, an apparatus is formed with a memory and a processor coupled to the memory. The processor is configured to add a leading 0 bit to a mantissa of the first multiplicand to form an expanded first mantissa, perform a partial-product multiplication of the expanded first mantissa and a mantissa of the second multiplicand to produce a partial-product sum mantissa and a partial-product carry mantissa, and change leading bits of the partial-product sum mantissa and the partial-product carry mantissa to 0 bits if the leading bits are both 1 bits and shift right the partial-product sum and the partial-product carry according to an exponent difference of a product of the first multiplicand and the second multiplicand. Otherwise the processor is configured to change by arithmetically shifting right both the partial-product sum mantissa and the partial-product carry mantissa according to the exponent difference.

In an embodiment, the first multiplicand is a first complex multiplicand, the second multiplicand is a second complex multiplicand, and the addend is a complex addend.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
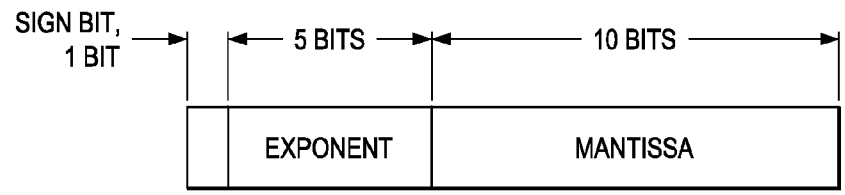
FIG. 1 illustrates a graphical representation of an example data format including a sign bit, exponent bits, and mantissa bits, to illustrate an application of an embodiment.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A logical device that performs a floating-point complex multiply-ACCumulate ("CMAC") operation performs one of the most frequently used operations in baseband signal processing in a wireless receiver, for example a wireless receiver in a base station or a mobile device, in a communication system as well as in other digital systems. Speeding up and improving the energy efficiency of a CMAC operation can greatly improve performance of a DSP or other digital device.

Arithmetic operations on complex numbers raise even further challenges. Such complex-number operations are performed separately on the real and imaginary components of each term. A substantial amount of logical processing must be performed which consumes a significant amount of silicon area for its implementation and requires a significant amount of time for its execution.

A frequent goal in the field of an instruction set architecture ("ISA") and micro-architecture design of DSPs is optimization of their ISA and micro-architecture designs. Optimization metrics include increasing DSP processing speed and throughput, and improving power efficiency and chip areal efficiency.

As introduced herein, an embodiment of a digital processing unit implements a fast process for a floating-point complex multiply-add process that can be used in a DSP, a hardware accelerator, etc.

In an embodiment, latency and the energy required to perform arithmetic operations on complex numbers are reduced. Characteristics of input data and intermediate calculation results are employed to produce a DSP or other arithmetic device that can efficiently execute a floating-point multiply-add operation that can be employed for complex input data.

An embodiment of a partial-product multiplication process with companion logic is described for a DSP, a hardware accelerator, or other arithmetic device to implement accumulation of a complex floating-point complex multiply-add operation:

$$ACC + A \times B \rightarrow ACC,$$

where the terms A, B, and ACC can be floating-point complex numbers, each component of which is generally represented in a digital floating-point format with a sign bit, exponent bits, and mantissa bits. The accumulated term ACC is an addend, and the terms A and B are first and second multiplicands, respectively. In a digital machine, the accumulated term ACC can be stored in one or more memory locations.

Accumulation of a complex floating-point complex multiply-add operation is one of the more frequently used operations in baseband signal processing, and its speed of computation frequently dominates the performance of a baseband DSP. By using a partial-product multiplier and companion logic, fusing floating-point complex multiplication and addition into one computation unit and truncating operand data width at an early stage, computational latency can be reduced. When the process is used in a DSP to implement a CMAC unit, the same computation unit can be employed to execute a floating-point complex multiply, a real multiply, and a real multiply-accumulate. This process can be implemented as a multi-stage pipeline process for higher throughput. Reducing the number of execution cycles in a CMAC unit is an efficient way to increase performance of a DSP.

Baseband signal processing does not require a floating-point CMAC operation to be implemented with a standard floating-point multiplication operation and a standard floating-point addition operation. Accordingly, as introduced herein, CMAC computation is simplified to meet precision requirements of baseband applications such as employed in Third Generation Partnership Program Long-Term Evolution ("3GPP LTE"), Universal Mobile Telecommunications System ("UMTS"), Global System for Mobile Communications ("GSM"), and other wireless communication systems. By using a partial-product multiplier and companion logic, hardware processing latency and power consumption of a CMAC can be reduced.

Instead of using two conventional floating-point additions to calculate the sum of an input addend and two products, the mantissas of the three addends are aligned, truncated, and then added with logic as described hereinbelow. Processing latency is reduced by using carry-save adders. The bit width of the adders is reduced by truncating the products of mantissas that can be addends. The bit width of the adders is determined according to a precision requirement of an application. In an embodiment, precision loss caused by truncation is at least partially compensated by increasing the bit width of the adders.

Rounding is not necessary for the final result to reduce hardware latency, which can still meet an accuracy requirement for baseband processing. Normalized data, e.g., mantissas normalized to the range 1≤mantissa<2, is used at the input to reduce hardware latency. In an embodiment, the addend of the CMAC operation is inputted in non-first pipeline stages to reduce an initiation interval of software pipelining.

It is understood that an adder can also perform subtraction by changing the sign bit of an input addend.

The real and imaginary parts of the result "ACC" of the CMAC operation are each the sum of two products and an input addend.

This is illustrated below by two processes in which an add-and-accumulate operation is performed on real and imaginary parts, ACC.real and ACC.imaginary. Each part resides in a binary register, and two real- and two imaginary-derived terms are added to a respective register to accumulate the respective result:

$$ACC.\text{real} + A.\text{real} \times B.\text{real} - A.\text{imaginary} \times B.\text{imaginary} \rightarrow ACC.\text{real}$$

$$ACC.\text{imaginary} + A.\text{real} \times B.\text{imaginary} + A.\text{imaginary} \times B.\text{real} \rightarrow ACC.\text{imaginary}$$

Thus, the data ACC.real and ACC.imaginary are accumulated in respective registers. The data in these registers can use the sign-exponent-mantissa data format illustrated in FIG. 1, which illustrates an example data format of an embodiment including a sign bit, exponent bits, and mantissa bits. In an embodiment, a leading "0" or "1" bit of the mantissa can be a hidden bit according to normalization. In an embodiment, the leading bit of the mantissa is a "1" bit and the mantissa is normalized to the range 1≤mantissa<2. In an embodiment, the leading bit of the mantissa can be a hidden bit.

Partial-product multiplication of two real factors A and B, mulpp(A, B), can be represented as a partial-product sum "mulpp_sum" and a partial-product carry "mulpp_carry":

$$\text{mulpp}(A,B) = \{\text{mulpp\_carry}, \text{mulpp\_sum}\}$$

where the complete product of A×B is given by the sum $$\text{mulpp\_carry} + \text{mulpp\_sum}.$$

Figure 2:
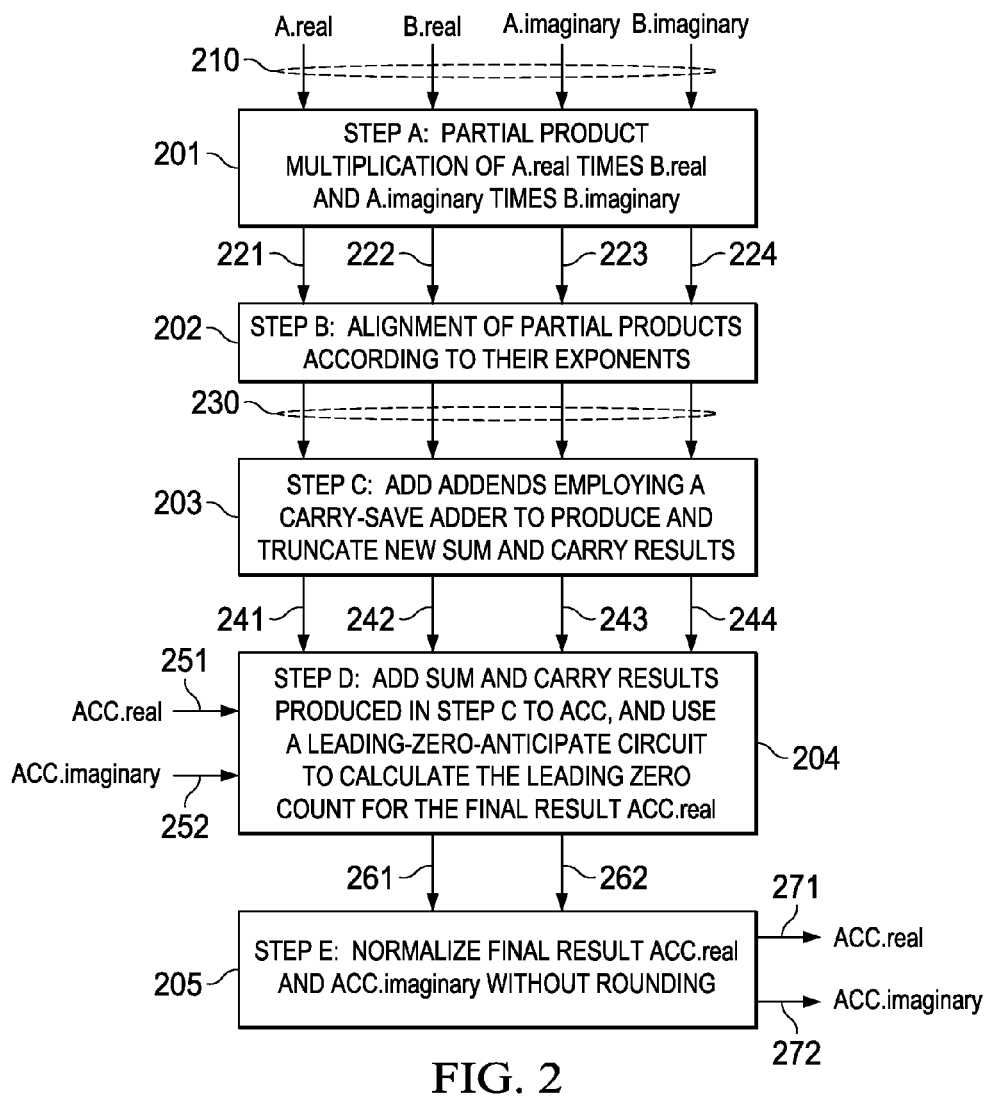
FIG. 2 illustrates a flowchart of a sequence of steps for accumulating real and imaginary parts of a floating-point, complex, multiply-accumulate operation, in accordance with an embodiment.

Referring now to FIG. 2, illustrated is a flowchart of a sequence of steps for accumulating the real and imaginary parts ACC.real and ACC.imaginary of the CMAC result, in accordance with an embodiment. Real and imaginary parts of multiplicands 210 are inputted to a first step, step A, in step or block 201.

In step A in step or block 201, partial-product multiplication is used for multiplication of A.real×B.real and A.imaginary×B.imaginary. Partial-product multiplication produces a sum and a carry for each product, i.e., sum 221 and carry 222 for A.real×B.real and sum 223 and carry 224 for A.imaginary×B.imaginary, as illustrated by the four arrows below block 201.

In step B in step or block 202, the four parts of the partial products produced in step A are aligned according to their respective product exponents.

In step C in step or block 203, a carry-save adder adds and truncates the four addend parts produced in step B, i.e., the two sums and the two carries 221, 222, 223, and 224. The carry-save adder adds a sum by ignoring carry bits and producing a separate carry resulting from the addition. The carry-save adder produces new sums 241 and 243 and new carries 242 and 244 for the respective real and imaginary parts. The carry-save adder shifts bits of the sums and the carries prior to adding, as described later hereinbelow.

In step D in step or block 204, the carry-save adder results produced in step C are added to the respective accumulated input, ACC.real, 251, and ACC.imaginary, 252, to produce non-normalized results, ACC.real, 261, and ACC.imaginary, 262. In an embodiment, a leading-zero-anticipate circuit is used to calculate a leading-zero count for the final, normalized results, ACC.real and ACC.imaginary. In an embodiment, the addition in step D is performed employing carry-look-ahead and carry-save adders.

In step E, in step or block 205, the final results, ACC.real, 271, and ACC.imaginary, 272, are normalized employing the leading-zero count from step D. In this step, the final results, ACC.real and ACC.imaginary, are normalized to produce hidden leading "1" bits for the mantissas. In an embodiment, the final results are not rounded.

For the alignment process performed in step B when employing registers of a fixed or given bit width, the two outputs from each partial-product multiplication are a "mulpp_sum" and "mulpp_carry." From implementation of a partial-product multiplier employing registers of a fixed bit width, $$(mulpp\_carry+mulpp\_sum)>>deltaE1$$

i.e., adding the terms mulpp_carry and mulpp_sum and then shifting the result through a distance deltaE1, which produces a correct result, is not equal to $$(mulpp\_carry>>deltaE1)+(mulpp\_sum>>deltaE1)$$

i.e., shifting each term through a distance deltaE1 and then adding. The operator ">>" followed by the parameter deltaE1 is used to indicate that the respective bits are shifted through a distance of deltaE1 bits. This indicates shifting a summed result employing registers of fixed bit widths is not the same as shifting the terms and then summing because a leading carry bit can be dropped when registers of a fixed bit width are employed.

An example of this error is illustrated for the case of adding the binary word "1011" to the binary word "1011." The bits will be shifted through a distance of 1 bit.

In the first case, the two binary words 1011 and 1011 are added, and the result is then shifted by one bit. Straightforward binary addition produces:

$$1011+1011 \rightarrow 10110.$$

The leading bit "1" of 10110 is dropped due to the fixed register size, leaving 0110, which yields the desired result of 0011 after shifting right by one bit in a fixed-bit-width register and adding a leading 0 bit.

In the second case, the same two binary words 1011 and 1011 are first shifted right by one bit to produce the two binary words 0101 and 0101, and these are then added:

$$0101+0101=1010,$$

which does not produce the desired result 0011. But the computation for the second case, nonetheless, can be implemented more efficiently than that for the first case in an embodiment.

To improve process speed in an embodiment, the terms mulpp_carry and mulpp_sum are shifted right before they are added, and an alteration/correction is made so that a desired result is achieved after adding the shifted terms.

By adding a leading "0" bit in front of one of the binary inputs of the partial-product multiplier, e.g., by adding a leading "0" bit in front of the (e.g., 8-bit) binary mantissa of A.real (i.e., in front of the most significant bit of the mantissa of A.real) to produce the (e.g., 9-bit) extended binary mantissa "0A.real", it follows that the first/leading bit of the (e.g., 17-bit) product of 0A.real with the (e.g., 8-bit) binary mantissa of "B.real $$0A.real \times B.real$$

will always be a "0" bit. If the first bit of mulpp_carry and the first bit of mulpp_sum are both "1" bits, then both of these bits are set to "0" before shifting, i.e., they are arithmetically shifted; otherwise the first bit does not need to be changed before shifting. The result of these alterations is $$((mulpp\_carry+mulpp\_sum)>>deltaE1$$

is now equal to $$((mulpp\_carry>>deltaE1)+(mulpp\_sum>>deltaE1)),$$

i.e., when registers of a fixed bit width are employed the summed result of first shifting the terms and then summing is now the same as summing and then shifting.

Computation of the imaginary part is performed in a similar way.

The input ACC.real and ACC.imaginary data are used after the alignment of the output of the partial-product multiplication (e.g., at step C). In this way, the number of bits required to form the ACC register is reduced. It is also helpful to use a pipelined process in the software for addition of the accumulated data to expedite execution.

Figure 3:
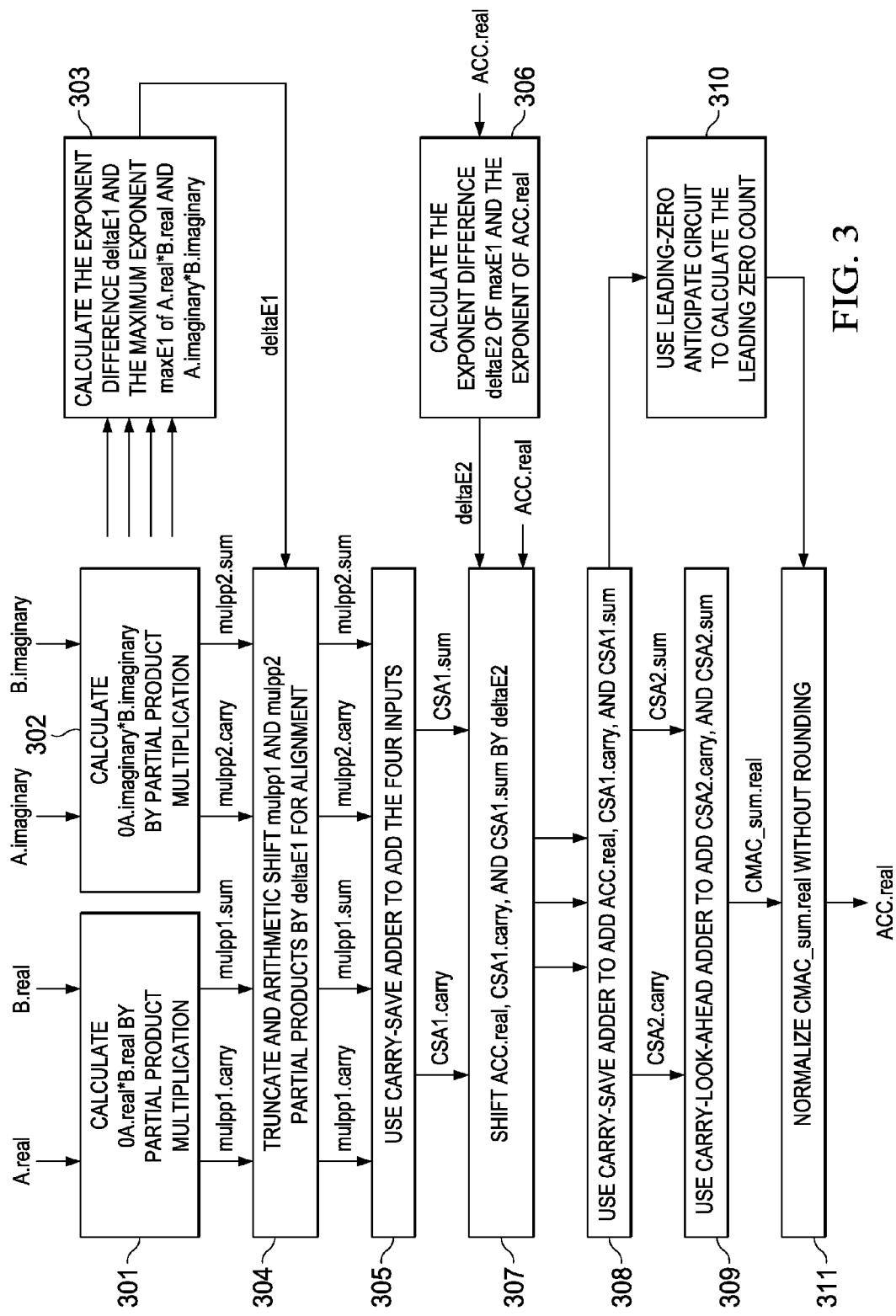
FIGS. 3 and 4 illustrate block diagrams showing execution of processes to compute a real part of a floating-point, multiply-accumulate operation, in accordance with an embodiment.

Referring now to FIG. 3, illustrated is a block diagram illustrating execution of the real part of a process to perform the floating-point CMAC operation ACC.real+A.real×B.real−A.imaginary×B.imaginary to accumulate the result ACC.real, in accordance with an embodiment. A process corresponding to that illustrated in FIG. 3 can be used to find the imaginary part ACC.imaginary.

In step or block 301, a leading 0 bit is appended to A.real to form "0A.real" and the partial products multpp1.sum and multpp1.carry of real parts 0A.real and B.real of multiplicand mantissas A and B are formed by partial-product multiplication. In step or block 302, a leading 0 bit is appended to A.imaginary to form "0A.imaginary" and the partial products multpp2.sum and multpp2 of imaginary parts A.imaginary and B.imaginary of the multiplicand mantissas A and B are formed by partial-product multiplication. The exponents of A.real×B.real and A.imaginary×B.imaginary are inputted to step or block 303, wherein the exponent difference deltaE1 and the maximum exponent maxE1 of A.real×B.real and A.imaginary×B.imaginary are calculated. In step or block 304, the partial products multpp1.sum, multpp1.carry, multpp2.sum, and multpp2.carry are truncated and arithmetically shifted by deltaE1 as described further hereinbelow. In step or block 305, the four shifted inputs multpp1.sum, multpp1.carry, multpp2.sum, and multpp2.carry are added with a carry-save adder to produce the results CSA1.carry and CSA1.sum. In step or block 306, the exponent difference deltaE2 of maxE1 and the exponent of ACC.real are calculated. In step or block 307, the mantissas of ACC.real, CSA1.carry, CSA1.sum are aligned by shifting the bits by deltaE2. In step or block 308, a carry-save adder is used to add ACC.real, CSA1.carry, and CSA1.sum to produce the summed result CSA2.carry and CSA2.sum. In step or block 309, a carry-look-ahead adder is used to add CSA2.carry and CSA2.sum to produce the summed result CMAC_sum.real. In step or block 310, a leading-zero anticipate circuit is used to calculate the leading zero count for CMAC_sum.real. In step or block 311, the summed result CMAC_sum.real is normalized using the results of the leading-zero anticipate circuit to produce a leading "1" bit for CMAC_sum.real. The normalized result is ACC.real. In an embodiment, the normalized result is not rounded.

For the normalization of the final result, leading-zero prediction is used to reduce processing latency. Leading-zero prediction allows the leading-zero count to be calculated in parallel with operation of the carry-look-ahead adder executed in step or block 309.

The speed of the calculation of an absolute value of a sum can be improved by computing the negative sum in parallel with the positive sum.

Figure 4:
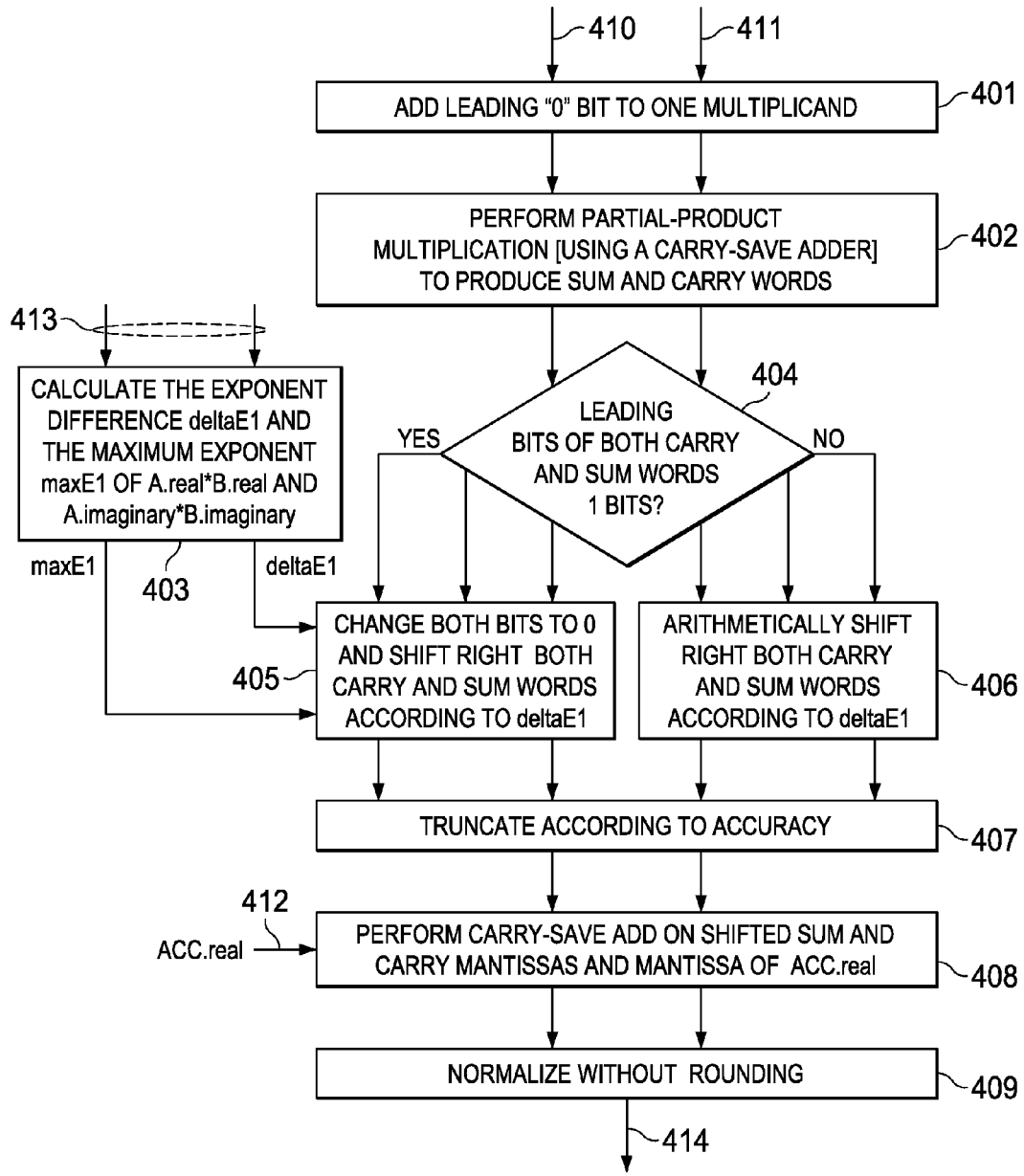

Referring now to FIG. 4, illustrated is a block diagram illustrating execution of a real part of a process to perform the floating-point CMAC operation ACC.real+A.real×B.real−A.imaginary×B.imaginary to accumulate the result ACC.real, in accordance with an embodiment. A process corresponding and similar to that illustrated in FIG. 4 can be used to accumulate the imaginary part ACC.imaginary.

Two multiplicand mantissas 410 and 411 are inputted to step or block 401 that adds a leading 0 bit to one of the multiplicands. For example, a leading 0 can be appended to A.real to form 0A.real. In step or block 402, partial-product multiplication is performed to produce sum and carry words. In an embodiment, the partial-product multiplication can employ a carry-save adder.

The real multiplicand exponents are inputted to block or step 403. Block or step 403 calculates the exponent difference deltaE1 and the maximum exponent maxE1 of A.real×B.real and A.imaginary×B.imaginary. In block or step 404, the leading bits of the carry and sum mantissas for are tested to see if they are both 1 bits. If they are both 1 bits, then in step or block 405, both leading bits are changed to 0 bits and both the carry and sum mantissas are shifted right according to deltaE1. If both leading bits of the carry and save mantissas are not 1 bits, then both the carry and sum mantissas are arithmetically shifted right according to deltaE1.

An arithmetic shift is an operation that is sometimes referred to as a signed shift (though it is not restricted to signed operands). For binary numbers it is a bitwise operation that shifts all of the bits of its operand. Every bit in the operand is shifted a given number of bit positions, e.g., to the right, and the vacated bit-positions, e.g., the vacated bit positions on the left, are filled in, and the original leftmost bit of the operand is replicated to fill in all the vacated positions.

In block or step 407, the aligned and shifted sum and carry mantissas are truncated according to an accuracy requirement.

The previously accumulated value of ACC.real, 412, is inputted to block or step 408. In block or step 408, the truncated aligned and shifted sum and carry mantissas and the mantissa of ACC.real, 412, are summed. In an embodiment, the summation is performed with a carry-save adder and a carry-look-ahead adder. In block or step 409, the summed results of block or step 408 are normalized to produce a normalized, summed sum, carry, and ACC mantissa. In an embodiment, the normalization is performed without rounding.

Figure 5:
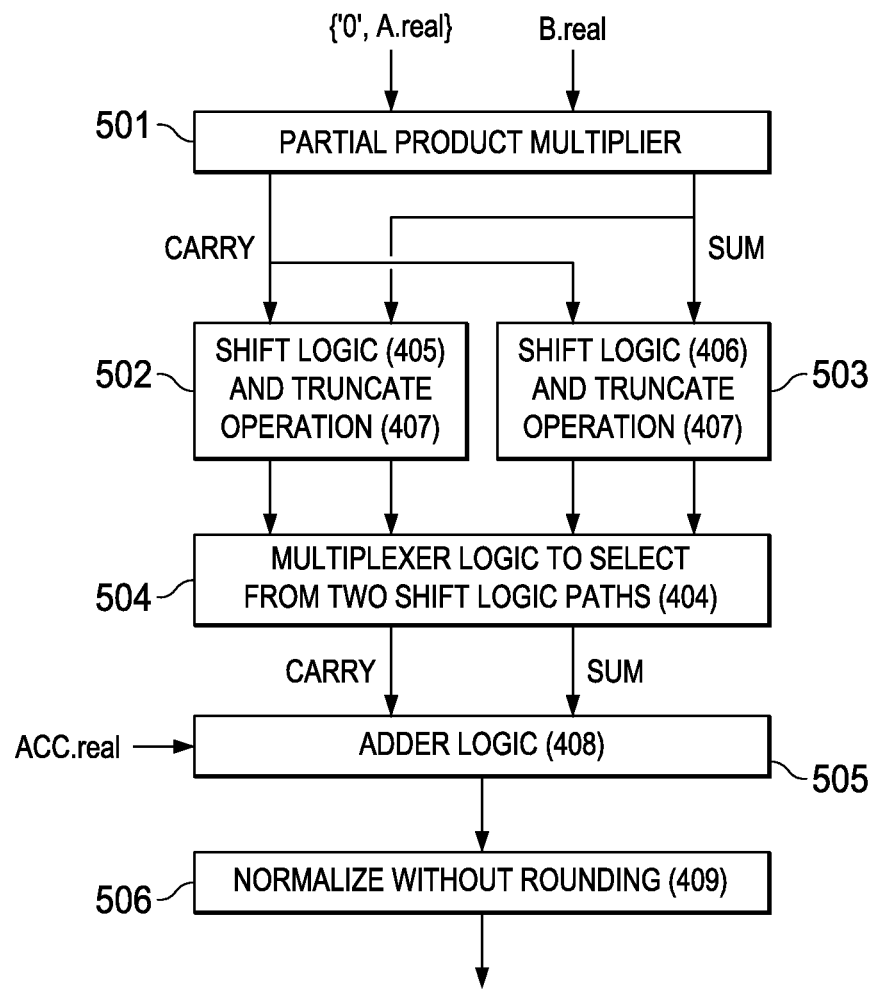
FIG. 5 illustrates a structure of a portion of an arithmetic logic unit ("ALU") that computes a real part of a floating-point, multiply-accumulate operation, in accordance with an embodiment.

Referring now to FIG. 5, illustrated is a structure of a portion of an ALU that computes a real part of a floating-point, multiply-accumulate operation, in accordance with an embodiment. Operations performed in this ALU correspond to operations illustrated and described hereinabove with reference to FIG. 4. In ALU block 501, a partial product multiplier operates on the inputs {'0', A.real} and B.real to form a carry and sum result. In ALU block 502, shift logic corresponding to the operation in block or step 405 and the truncate operation corresponding to the operation in block or step 407 are performed. In ALU block 503, shift logic corresponding to the operation in block or step 406 and the truncate operation corresponding to the operation in the block or step 407 are performed. In ALU block 504, multiplexer logic selects a result of one of the two shift logic paths 502 and 503 corresponding to the operation performed in block 504, i.e., the leading bits of the carry and save mantissas for are tested to see if they are both 1 bits. In ALU block 505, adder logic corresponding to the operation in block or step 408 operates on the input ACC.real and the carry and sum result produced in block 504, i.e., the truncated aligned and shifted sum and carry mantissas and the mantissa of ACC.real are summed. In ALU block 506, the adder result produced in block 505 is normalized without rounding, corresponding to the operation in block or step 409, i.e., the summed results of ALU block 505 are normalized to produce a normalized, summed sum, carry, and ACC mantissa.

Figure 6:
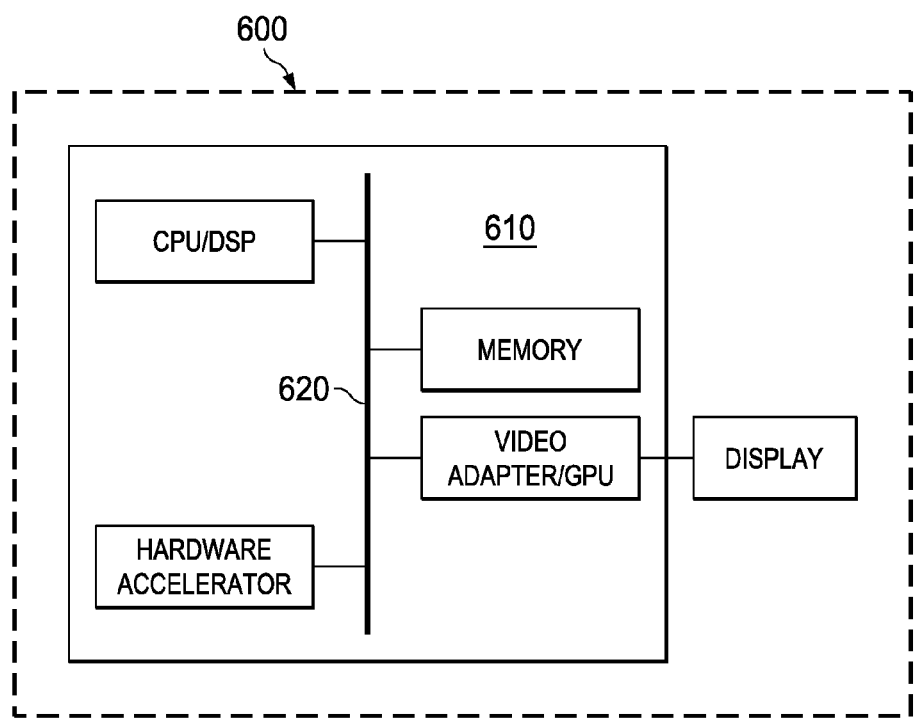
FIG. 6 illustrates a block diagram of elements of a processing system that may be used to perform one or more of the processes discussed herein, in accordance with an embodiment.

Referring now to FIG. 6, illustrated is a block diagram of elements of a processing system 600 that may be used to perform one or more of the processes discussed hereinabove, in accordance with an embodiment. The processing system 600 may comprise a processor 610 that may optionally be equipped with one or more input/output devices, such as a video adapter/graphics processing unit ("GPU"). The processor 610 may include a central processing unit ("CPU")/DSP, memory, and a hardware accelerator connected to a bus 620.

The bus 620 may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), nonvolatile random access memory ("NVRAM"), a combination thereof, or the like. In an embodiment, the memory may include ROM for use at boot-up, and DRAM for data storage for use while executing programs.

The video adapter/GPU provides an interface to optionally couple the processor to a display. Other devices may be coupled to the processor, and additional or fewer interface cards may be utilized. For example, a parallel interface card (not shown) may be used to provide a parallel interface for a printer.

The processor may also include a network interface (not shown), which can be a wired link, such as an Ethernet cable or the like, and/or a wireless link to enable communication with a network such as a cellular communication network. The network interface allows the processor to communicate with remote units via the network. In an embodiment, the processor is coupled to a local-area network or a wide-area network to provide communications to remote devices, such as other processors, the Internet, remote storage facilities, or the like.

It should be noted that the processing system may include other components. For example, the processing system may include power supplies, cables, a motherboard, removable storage media, cases, and the like. These other components, although not shown, are considered part of the processing system.

A result of using the method described hereinabove in a complex multiply-add operation is improved performance and power efficiency of floating point DSPs and hardware accelerators. Higher power efficiency and higher processing speed can be achieved. Substantial benefits can accrue to a wireless baseband digital signal processor or a system-on-chip ("SOC") for base stations and terminal devices.

It is noted that, unless indicated otherwise, functions described herein can be performed in either hardware or software, or some combination thereof, with or without human intervention. In an embodiment, the functions are performed by a processor such as a computer or an electronic data processor, such as that discussed hereinabove with reference to FIG. 5, in accordance with code such as computer program code, software, and/or integrated circuits that are coded to perform such functions, unless indicated otherwise.

Embodiments such as those presented herein provide an apparatus and a related method to perform a floating-point multiply-add process on a first multiplicand, a second multiplicand, and an addend. The apparatus is formed with a memory and a processor coupled to the memory. In an embodiment, the processor is configured to add a leading 0 bit to a mantissa of the first multiplicand to form an expanded first mantissa, perform a partial-product multiplication of the expanded first mantissa and a mantissa of the second multiplicand to produce a partial-product sum mantissa and a partial-product carry mantissa, and change leading bits of the partial-product sum mantissa and the partial-product carry mantissa to 0 bits if the leading bits are both 1 bits and shift right the partial-product sum and the partial-product carry according to an exponent difference of a product of the first multiplicand and the second multiplicand. Otherwise the processor is configured to change by arithmetically shifting right both the partial-product sum mantissa and the partial-product carry mantissa according to the exponent difference. In an embodiment, the first multiplicand is a first complex multiplicand, the second multiplicand is a second complex multiplicand, and the addend is a complex addend.

In an embodiment, the processor is further configured to truncate the changed partial-product sum mantissa and the partial-product carry mantissa.

In an embodiment, the processor is further configured to accumulate a mantissa of the addend, the truncated changed partial-product sum mantissa, and the truncated changed partial-product carry mantissa to produce an accumulated mantissa sum. In an embodiment, the accumulation is performed with a carry-save adder and a carry-look-ahead adder. In an embodiment, the processor is further configured to postpone use accumulation of the mantissa of the addend to a later pipelined stage.

In an embodiment, the processor is further configured to normalize the accumulated mantissa sum. In an embodiment, the processor is further configured to normalize the accumulated mantissa sum without rounding.

In an embodiment, a format of the first multiplicand, the second multiplicand, and the addend comprises a sign-exponent-mantissa format.

In an embodiment, the processor is configured to perform the partial-product multiplication of the expanded first mantissa and a mantissa of the second multiplicand with a carry-save adder. In an embodiment, the first multiplicand, the second multiplicand, and the addend comprise normalized data.

In an embodiment, the processor is configured to employ the apparatus in baseband signal processing in a wireless receiver.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus configured to perform a floating-point multiply-add process on a first multiplicand, a second multiplicand, and an addend, comprising:
    a memory; and
    a processor coupled to the memory, the processor, in conjunction with the memory, configured to receive a wireless baseband signal and generate the first multiplicand, the second multiplicand and the addend in accordance with the wireless baseband signal, the processor comprising:
        a hardware multiplier configured to perform a partial-product multiplication of an expanded first mantissa and a mantissa of the second multiplicand to produce a partial-product sum mantissa and a partial-product carry mantissa, wherein the expanded first mantissa is a mantissa of the first multiplicand with an added leading 0 bit,
        a hardware shifter configured to change leading bits of the partial-product sum mantissa and the partial-product carry mantissa to 0 bits if the leading bits are both 1 bits and shift right the partial-product sum and the partial-product carry, otherwise arithmetically shift right both the partial-product sum mantissa and the partial-product carry mantissa,
        hardware truncation logic configured to truncate the changed partial-product sum mantissa and the partial-product carry mantissa, and
        a hardware adder configured to accumulate a mantissa of the addend, the truncated changed partial-product sum mantissa, and the truncated changed partial-product carry mantissa in an arithmetic register to produce an accumulated mantissa sum representing a result of the floating-point multiply-add process;
    the processor further configured to use the accumulated mantissa sum, representing the result of the floating-point multiply-add process, in processing the wireless baseband signal.

2. The apparatus as in claim 1 wherein the accumulation is performed with a carry-save adder and a carry-look-ahead adder.

3. The apparatus as in claim 1 wherein the processor is further configured to postpone accumulation of the mantissa of the addend to a later pipelined stage.

4. The apparatus as in claim 1 wherein the processor is further configured to normalize the accumulated mantissa sum without rounding.

5. The apparatus as in claim 1 wherein a format of the first multiplicand, the second multiplicand, and the addend comprises a sign-exponent-mantissa format.

6. The apparatus as in claim 1 wherein the processor is configured to perform the partial-product multiplication of the expanded first mantissa and a mantissa of the second multiplicand with a carry-save adder.

7. The apparatus as in claim 1 wherein the first multiplicand, the second multiplicand, and the addend comprise normalized data.

8. The apparatus as in claim 1 wherein the apparatus is a wireless receiver.

9. The apparatus as in claim 1 wherein the first multiplicand is a first complex multiplicand, the second multiplicand is a second complex multiplicand, and the addend is a complex addend.

10. The apparatus as in claim 1 wherein the processor is further configured to change the leading bits of the partial-product sum mantissa and the partial-product carry mantissa to 0 bits if the leading bits are both 1 bits and shift right the partial-product sum and the partial-product carry according to an exponent difference of a product of the first multiplicand and the second multiplicand, otherwise arithmetically shift right both the partial-product sum mantissa and the partial-product carry mantissa according to the exponent difference.

11. A method of performing a floating-point multiply-add process on a first multiplicand, a second multiplicand, and an addend, the method comprising:
    receiving a wireless baseband signal;
    generating the first multiplicand, the second multiplicand and the addend in accordance with the wireless baseband signal;
    adding a leading 0 bit to a mantissa of the first multiplicand to form an expanded first mantissa;

performing, by a hardware multiplier, a partial-product multiplication of the expanded first mantissa and a mantissa of the second multiplicand to produce a partial-product sum mantissa and a partial-product carry mantissa;

changing, by a hardware shifter, leading bits of the partial-product sum mantissa and the partial-product carry mantissa to 0 bits if the leading bits are both 1 bits and shifting right the partial-product sum and the partial-product carry according to an exponent difference of a product of the first multiplicand and the second multiplicand, otherwise arithmetically shifting right both the partial-product sum mantissa and the partial-product carry mantissa;

truncating, by hardware truncation logic, the changed partial-product sum mantissa and the partial-product carry mantissa;

accumulating, by a hardware adder, a mantissa of the addend, the truncated changed partial-product sum mantissa, and the truncated changed partial-product carry mantissa to provide an accumulated mantissa sum representing a result of the floating-point multiply-add process; and using the accumulated mantissa sum, representing the result of the floating-point multiply-add process, in processing the wireless baseband signal.

12. The method as recited in claim 11 further comprising normalizing the accumulated mantissa sum without rounding.

13. The method as recited in claim 11 wherein a format of the first multiplicand, the second multiplicand, and the addend comprises a sign-exponent-mantissa format.

14. The method as recited in claim 11 further comprising performing the partial-product multiplication of the expanded first mantissa and a mantissa of the second multiplicand with a carry-save adder.

15. The method as recited in claim 11 wherein the first multiplicand is a first complex multiplicand, the second multiplicand is a second complex multiplicand, and the addend is a complex addend.

16. The method as recited in claim 11 further comprising changing the leading bits of the partial-product sum mantissa and the partial-product carry mantissa to 0 bits if the leading bits are both 1 bits and shifting right the partial-product sum and the partial-product carry according to an exponent difference of a product of the first multiplicand and the second multiplicand, otherwise arithmetically shifting right both the partial-product sum mantissa and the partial-product carry mantissa according to the exponent difference.

17. The method as recited in claim 11 wherein the accumulating is performed with a carry-save adder and a carry-look-ahead adder.

18. The method as recited in claim 11 further comprising postponing accumulating of the mantissa of the addend to a later pipelined stage.

19. The method as recited in claim 11 wherein the first multiplicand, the second multiplicand, and the addend comprise normalized data.

20. The method as recited in claim 11 wherein the multiplier, shifter, truncation logic and adder are in a wireless receiver.

* * * * *